United States Patent [19]
Tanaka et al.

[11] Patent Number: 5,474,588
[45] Date of Patent: Dec. 12, 1995

[54] SOLUTION DOPING OF A SILICA PREFORM WITH ERBIUM, ALUMINUM AND PHOSPHORUS TO FORM AN OPTICAL FIBER

[75] Inventors: Daiichirou Tanaka, Yotsukaido; Akira Wada, Sakura; Tetsuya Sakai, Sakura; Tetsuo Nozawa, Sakura; Ryozo Yamauchi, Sakura, all of Japan

[73] Assignee: Fujikura Ltd, Tokyo, Japan

[21] Appl. No.: 308,165

[22] Filed: Sep. 16, 1994

Related U.S. Application Data

[63] Continuation of Ser. No. 42,307, Apr. 2, 1993.

[30] Foreign Application Priority Data

Apr. 7, 1992 [JP] Japan .................................. 4-085664

[51] Int. Cl.⁶ .............................................. C03B 37/012
[52] U.S. Cl. .............................................. 65/390; 65/399
[58] Field of Search .............................. 65/390, 399, 901

[56] References Cited

U.S. PATENT DOCUMENTS

| | | |
|---|---|---|
| 4,923,279 | 5/1990 | Ainslie . |
| 5,047,076 | 9/1991 | Cognolato ................................ 65/3.12 |
| 5,123,940 | 6/1992 | DiGiovanni et al. . |
| 5,151,117 | 9/1992 | Bartholomew ........................... 65/3.12 |
| 5,262,365 | 11/1993 | Oyobe ...................................... 65/30.13 |

FOREIGN PATENT DOCUMENTS

| | | |
|---|---|---|
| 0466932 | 1/1992 | European Pat. Off. . |
| 1096021 | 4/1989 | Japan ....................................... 65/3.12 |
| 2229726 | 9/1990 | Japan ...................................... 65/30.13 |
| 4154641 | 5/1992 | Japan ....................................... 65/3.12 |

OTHER PUBLICATIONS

T. Gozen, Y. Kikukawa, M. Yoshida, H. Tanaka and T. Shintani, in Technical Digest, Optical Fiber Conference, '88 (1988).
Database WPIL, Section Ch, Week 49, Dwrwent Publications, Ltd., London, GB;Class L01, An 92–403114 & JP 4,300,224, 23 Oct. 1992, abstract.
Patent Abstracts of Japan, vol. 16, No. 49 (C–908), Feb. 7, 1992, & JP 3,252,320, Nov. 11, 1991, abstract.
"Journal of Lightwave Technology", vol. 9, No. 2, Feb. 1991, New York, N.Y., pp. 220–227, B. J. Ainslie, A Review of the Fabrication . . . Amplifiers.

*Primary Examiner*—David A. Simmons
*Assistant Examiner*—John Hoffmann
*Attorney, Agent, or Firm*—Sprung Horn Kramer and Woods

[57] ABSTRACT

A manufacturing method for erbium doped silica, having a soot formation process, in which a silica glass soot is deposited on a seed rod for forming a soot preform in a porous state on the seed rod, a dopant impregnation process, wherein the soot preform is impregnated with at least an erbium compound, and a preform formation process, wherein this soot preform impregnated with a dopant is heated and rendered transparent. The dopant impregnation process is provided with an operation in which the soot preform obtained in the soot formation process is dipped in a solution containing an erbium compound, an aluminum compound, and a phosphorus compound; this is then desiccated, and soot preform which is impregnated with the erbium compound, the aluminum compound, and the phosphorus compound is obtained.

6 Claims, 5 Drawing Sheets

DIAMETER OF SUIT PREFORM 35
(RELATIVE VALUE)

DIAMETER OF SINTERED SUIT PREFORM 42
(RELATIVE VALUE)

SOLUTION DOPING OF A SILICA PREFORM WITH ERBIUM, ALUMINUM AND PHOSPHORUS TO FORM AN OPTICAL FIBER

This application is a continuation of application Ser. No. 08/042,307, now filed Apr. 2, 1993.

BACKGROUND OF THE INVENTION

1. Field of the Invention

The present invention relates to an erbium-doped silica which is suitable for use in the manufacturing of optical fibers which are applied to optical fiber technologies such as the direct optical amplification and the like, and particularly relates to a manufacturing method for erbium-aluminum-phosphorus doped silica which utilizes aluminum, phosphorus, and the like, as co-dopants in addition to erbium, and which makes possible an increase in gain wavelength band.

2. Background Art

The direct optical amplification by means of optical fibers doped with rare earth metals is an example of an optical fiber technique which has attracted attention of late. FIG. 6 shows an example of such amplification technique; in the amplifier shown in FIG. 6, an pumping light 3 from an pumping light source (not shown in the drawing) is incidented into an optical fiber 1 (particularly hopeful as this optical fiber 1 are Er-doped single mode fibers objected for optical amplification in the 1.55 μm wavelength band), using a WDM type optical coupler 2, and a signal light 4 is introduced simultaneously through an isolator 6a. By means of this, the energy of the erbium ions excited by pumping light 3 is applied to signal light 4 by means of induced emission, and the signal light amplified by means of this passes through an isolator 6b and is transmitted to fiber channel 5.

However, simple erbium-singly-doped optical fibers having a core doped solely with erbium ions have a gain wavelength band which is unstable in the vicinity of the 1.55 μm wavelength band (1.53 μm–1.56 μm), as shown by line A in the graph of FIG. 7, when a small signal is used; because of this, such fibers are not suitable for use as materials for the manufacture of an optical fiber 1 constituting the above optical amplifier, which requires signal light having superior gain wavelength band stability.

An erbium-aluminum co-doped optical fiber having a core which has been subjected to the co-doping of erbium ions and aluminum ions, which stabilize the gain wavelength band of the erbium ions, has been proposed. This erbium-aluminum co-doped optical fiber is known to have a small wavelength dependency of the gain in the vicinity of the 1.55 μm wavelength band, in comparison with the erbium-singly-doped optical fiber, as shown by line B in the graph of FIG. 7.

A VAD method, for example, is preferably employed in the manufacture of the erbium-aluminum co-doped optical fibers described above. In this method, first, as shown in FIG. 8, a glass seed rod 12 is placed within a reaction chamber 11. Next, oxygen and hydrogen gas are supplied to a burner 13 which is provided on this reaction chamber 11, and a flame is formed; this flame is directed to the lead end of the glass seed rod 12, $SiCl_4$ gas, consisting of vaporized liquid form $SiCl_4$, is supplied through the burner 13, this is subjected to pyrolysis, $SiO_2$ microparticles (soot) are formed, and this soot is deposited on the lead end of glass seed rod 12 for forming a soot preform 14. Next, this obtained soot preform 14 is dipped in an alcohol solution of $ErCl_3$ and $AlCl_3$, this is desiccated, this is heated and made transparent in an atmosphere of He or the like, and a preform in which erbium ions and aluminum ions are co-doped is thereby produced.

Next, an optical fiber preform was manufactured using the above preform as a core preform. For example, methods were employed such as: a method in which the above core preform was inserted into a hole for core preform insertion provided in the central portion of a separately produced cladding preform, this was fused to form an integral structure, and an optical fiber preform was thus formed; a method in which soot for cladding was deposited on the outer circumference of the above core preform, thus obtained soot preform for cladding was heated so as to become transparent, and cladding thus formed, thus forming an optical fiber preform; and like methods.

Finally, this optical fiber preform was subjected to fiber drawing, and an erbium-aluminum co-doped optical fiber was manufactured.

However, in the above methods, when the doping concentration of $AlCl_3$ in the silica exceeds 3 wt %, segregation of the $AlCl_3$ occurs, and a crystal of the $AlCl_3$ is precipitated within the silica, so that a problem existed in that $AlCl_3$ could not be doped at high concentrations.

A method is known for the prevention of this $AlCl_3$ segregation phenomenon in which a phosphorus compound (for example, $POCl_3$) having the effect of suppressing the segregation of $AlCl_3$ was emitted through the burner 13 together with $SiCl_4$ and thus applied in soot preform 14, and after this, this was impregnated with in an alcohol solution of $ErCl_3$ and $AlCl_3$ by means of a VAD dipping method identical to that described above, this was then desiccated, and soot preform 14 was heated and made transparent.

In the above method, when soot was deposited on the lead end of glass seed rod 12, a phosphorus compound having the effect of suppressing the segregation of $AlCl_3$ was doped within soot, and thus formed soot preform 14, having a phosphorus compound doped therein, was heated and made transparent in a mixed atmosphere of gasses produced by the sublimation of $ErCl_3$ and $AlCl_3$, thus forming a preform; an attempt was thus made to realize a high doping concentration of aluminum ions in the silica preform by means of preventing the crystallization of $AlCl_3$.

However, as explained above, when a phosphorus compound is doped in soot at the time of the deposition of soot, the viscosity of the each soot having a phosphorus compound doped therein is reduced, and as a result of this reduction in viscosity of soot, the bulk density of the soot preform 14 which is formed increases in an undesirable manner, and as a result of this, there was a problem in that the doping concentration of the aluminum compound was reduced.

Furthermore, the operation of doping a phosphorus compound within soot while continuously depositing soot on the lead end of glass seed rod 12 is conducted using burner 13, so that there was a problem in that, as a result of the irregularities of the heating temperature of this burner 13, the doping concentration of the phosphorus compound, and the concentration of the other dopants doped in the liquid phase later, was not uniform between the central region of the soot preform 14, which had a high heating temperature, and the peripheral area of the soot preform 14, which had a low heating temperature.

Furthermore, differences in viscosity resulting from differences in phosphorus concentration were large, so that it was difficult to heat the soot preform and make it transparent at the time of sintering, and a problem existed in that it was difficult to obtain solid glass, as the shrinkage of the inner side of the soot preform progressed even though the outer side thereof remained in a soot state.

SUMMARY OF THE INVENTION

It is an object of the present invention to provide a manufacturing method for erbium doped silica which makes possible the doping, homogeneously and at high concentrations, of dopants such as erbium compounds, aluminum compounds, phosphorus compounds, and the like, in silica glass.

The present invention thus provides a manufacturing method for erbium doped silica, having a soot formation process for depositing a soot on a seed rod and forming soot preform in a porous state on the seed rod, a dopant impregnation process for impregnating at least an erbium compound in the soot preform, wherein soot preform obtained in the soot formation process is dipped in a solution containing an erbium compound, an aluminum compound, and a phosphorus compound, the soot preform is desiccated, and the soot preform impregnated with the erbium compound, the aluminum compound, and the phosphorus compound is produced, and a preform formation process for heating and making transparent the soot preform impregnated with the above-described dopant.

In accordance with the manufacturing method for erbium doped silica of the present invention, in the dopant impregnation process, the soot preform which is formed in the soot formation process is dipped in a solution containing an erbium compound, an aluminum compound, and a phosphorus compound, this is desiccated, and an operation is thus conducted for the production of soot preform impregnated with this erbium compound, aluminum compound, and phosphorus compound, so that the dopant concentrations and component ratio distributions of the erbium compound, aluminum compound, and phosphorus compound within the soot preform after impregnation can be controlled in an extremely accurate and homogeneous manner. Accordingly, the preform, which is obtained by means of heating and rendering transparent this soot preform which has been thus impregnated, is an erbium-aluminum-phosphorus doped silica material having a dopant concentration and component ratio distribution of erbium ions, aluminum ions, and phosphorus ions which is extremely accurate and homogeneous in the radial direction and the longitudinal direction of the preform.

Furthermore, the preform has a dopant concentration and component ratio distribution of erbium ions, aluminum ions, and phosphorus ions which is extremely accurate and homogeneous in the radial and longitudinal directions thereof, so that, in an optical fiber which is produced using such a preform as a core thereof, the problems which existed in erbium doped optical fibers produced by means of conventional methods, that is to say, the low concentration of erbium ions and aluminum ions in the core region, are solved. Accordingly, an optical amplifier constructed using this optical fiber has an excitation efficiency which is clearly superior to that of a conventional optical amplifier.

Furthermore, in the manufacturing method for erbium doped silica of the present invention, the soot preform is impregnated with an aluminum compound and a phosphorus compound which has the effect of suppressing the segregation of this aluminum compound, in addition to the erbium compound, so that the segregation of the aluminum compound is suppressed in the preform formation process, and by means of this, it is possible to set the doping concentration of the aluminum ions in the preform at a high level.

In addition, the preform has a high doping concentration of aluminum ions, as explained above, so that an optical fiber using this preform as a core has a wide gain wavelength band in comparison with conventional erbium doped optical fibers. Accordingly, it is possible to broaden the band of the gain wavelength band characteristics of an optical amplifier which is constructed using such optical fibers.

DETAILED DESCRIPTION OF THE PREFERRED EMBODIMENTS

Figure 1:
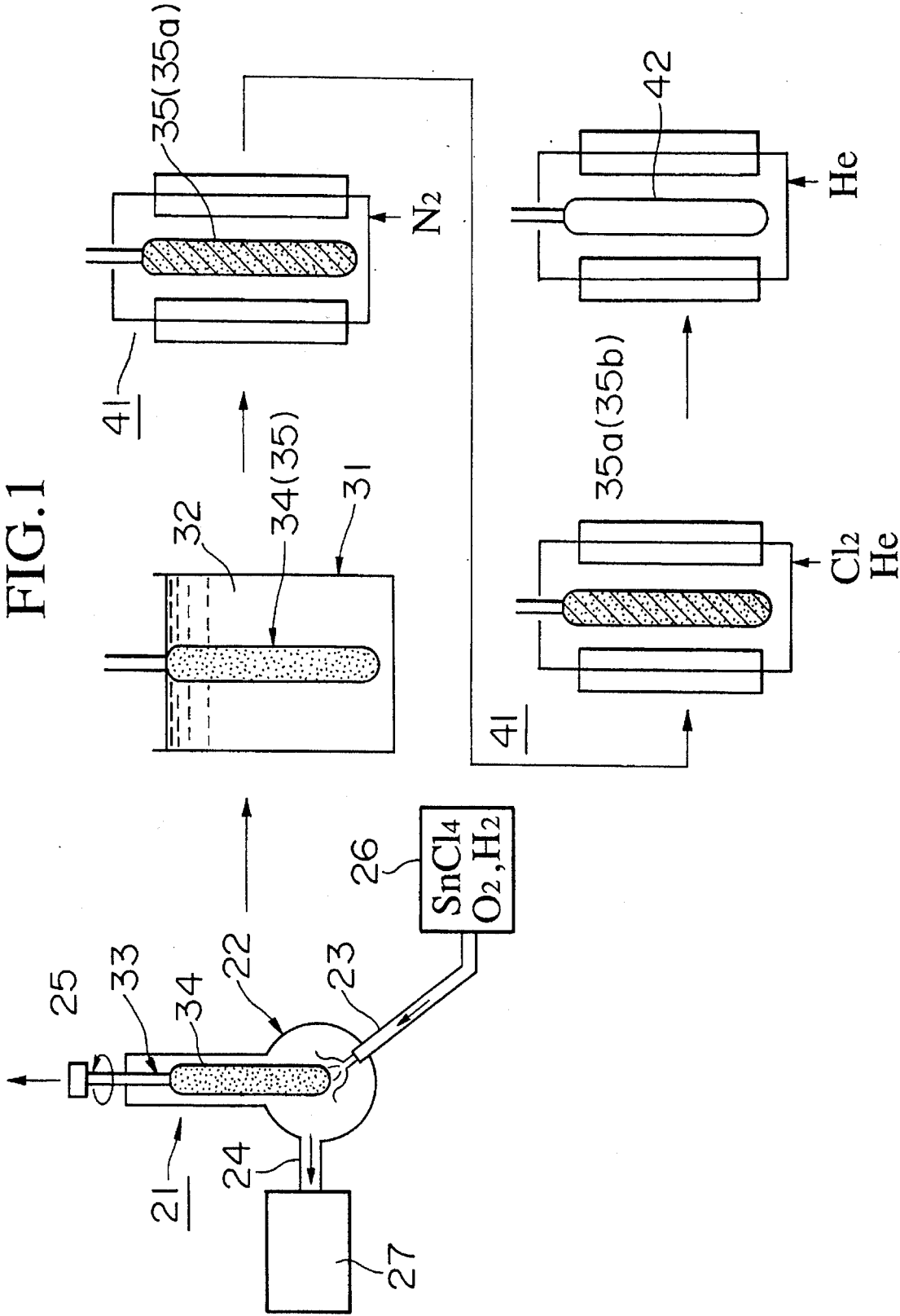
FIG. 1 shows an example of an erbium doped silica manufacturing apparatus which is appropriate for conducting the manufacturing method for erbium doped silica in accordance with the present invention.

Hereinbelow, a preferred embodiment of the manufacturing method for erbium-doped silica of the present invention will be explained in detail with reference to the figures. FIG. 1 shows an example of an erbium doped silica manufacturing apparatus which is appropriate for conducting the manufacturing method for erbium doped silica of the present invention; in the figure, reference numeral 21 indicates a VAD apparatus; reference numeral 31 indicates a dopant solution vessel; and reference numeral 41 indicates a heating furnace for a preform.

[1] Soot Formation Process

In conducting the manufacturing method for erbium doped silica of the present invention using the above-described erbium doped silica manufacturing apparatus, a soot preform is first formed in VAD apparatus 21. This VAD apparatus 21 is comprising a reaction chamber 22; a burner 23, which is provided at a bottom of this reaction chamber 22 and which has an opening facing the inside of the reaction chamber 22; a duct 24, which is connected to reaction chamber 22 and permits to introduce an used gas from within reaction chamber 22 to exhaust gas processing apparatus 27; a base material lifting apparatus 25, which is provided above reaction chamber 22 and moves a glass seed rod 33 disposed within reaction chamber 22 in an upwards and downwards direction; and a gas supply apparatus 26, which is in communication with the burner 23 and supplies raw material gas, oxygen gas, and hydrogen gas to the inside of reaction chamber 22.

In the course of producing this soot preform in VAD apparatus 21, first, one end of a silica glass seed rod 33 is connected to base material lifting apparatus 25 provided above reaction chamber 22, and the other end of this silica glass seed rod 33 is disposed within reaction chamber 22 so as to be placed in the vicinity of the opening of burner 23.

Next, using gas supply apparatus 26, 450–550 cc of $SiCl_4$ per minute, 15 liters of $O_2$ gas per minute, and 10 liters of $H_2$ gas per minute were introduced into burner 23, flame hydrolysis and a thermal oxidation reaction were conducted, the $SiCl_4$ was subjected to pyrolysis and soot comprising $SiO_2$ microparticles was formed, and this soot was deposited on the lead end of silica glass seed rod 33. Furthermore, during this soot deposition operation, the silica glass seed rod 33 was moved upwards by means of base material lifting apparatus 25, soot was deposited in the direction of the lower end of silica glass seed rod 33 at a speed of 55–65 mm per hour, and thereby, a soot preform 34 having a desired length was obtained.

[2] Dopant Impregnation Process

Next, the soot preform 34 obtained in the soot formation process is placed in a dopant solution vessel 31, which is filled with a dopant solution containing dopants, such as an erbium compound, an aluminum compound, and a phosphorus compound, and this soot preform 34 is impregnated with this erbium compound, aluminum compound, and phosphorus compound.

Among erbium compounds used herein, erbium compounds such as, for example, $ErCl_3$, $ErCl_3 \cdot \frac{1}{2}H_2O$, $ErCl_3 \cdot 6H_2O$, and the like, are preferable for use, but the present invention is not limited thereto; any compound may be used so long as it can be dissolved in the solvent which is used. Furthermore, the concentration of the erbium compound in the dopant solution can be adjusted to a desired concentration depending upon a necessity. For example, in the case in which pure ethanol is used as the solvent, various concentration conditions are possible, the upper limit thereof being 0.54 (wt %), which is the almost highest soluble concentration of $ErCl_3$ (anhydride) with respect to ethanol.

Furthermore, among aluminum compounds which are used herein, aluminum salts, such as, for example, $AlCl_3$, $AlCl_3 \cdot 6H_2O$, and the like, are preferable for use, but the present invention is not limited thereto; any compound which is soluble in the solvent which is used may be employed, as in the case of the erbium compound described above. Furthermore, in the case in which pure ethanol is used as the solvent, for example, the concentration of the aluminum compound in the dopant solution should be below 20 (wt %), in the case of $AlCl_3$ (anhydride). The reason for this is that if the concentration thereof exceeds 20 (wt %), $AlCl_3$ would be precipitated.

Furthermore, among phosphorus compounds used herein, phosphoric esters, such as, for example, $PO(OC_2H_5)$, $P(OCH_3)$, $PO(OCH_3)_3$, $PO(OC_3H_5)_3$, and the like, are preferable, but the present invention is not limited thereto; any compound which is soluble in the solvent used may be employed. Furthermore, in the case in which ethanol is used as the solvent, the concentration of the phosphorus compound in the dopant solution should preferably be within a range of approximately 1.0–2.0 (wt %), when $(CH_3O)_3PO$ is employed. The reason for this is that when the concentration thereof is less than 1.0 (wt %), the phosphorus doping effect becomes weak, and furthermore, when this concentration exceeds 2.0 (wt %), the glass viscosity is reduced to an undesirable extent.

Furthermore, preferable examples of the solvent in which the above-described dopants are dissolved include, for example, alcohols such as ethanol and methanol and the like, and water; however, the present invention is not limited thereto, as it is possible to employ any solvent which is capable of dissolving the dopants which are used.

In order to impregnate soot preform 34 with an erbium compound, an aluminum compound, and a phosphorus compound, within dopant solution vessel 31, an ethanol solution containing 0.1–0.6 (wt %) of $ErCl_3$, 20 (wt %) of $AlCl_3$, and 1.0–2.0 (wt %) of $PO(OC_2H_5)$ is placed within dopant solution vessel 31, and soot preform 34 is dipped in this ethanol solution. By means of this, an impregnated soot preform 35, consisting of a soot preform 34 impregnated with the dopants described above, is obtained.

[3] Preform Formation Process

Next, the dopant impregnated soot preform 35, which was passed through the dopant impregnation process described above, is placed within heating furnace 41 for preforms, this soot preform is heated and rendered transparent, and a preform 42 is produced.

In order to produce a preform 42 by heating and making transparent an impregnated soot preform 35 within a heating furnace 41 for preforms, first, the impregnated soot preform 35 is desiccated for a period of 24–240 hours at a temperature of 60°–70° C. in an atmosphere of nitrogen gas or inert gas. Next, this desiccated soot preform 35a is heated and dehydrated for a period of 2.5–3.5 hours at a temperature of 950°–1050° C. in a atmosphere of a helium gas containing chlorine gas in an amount of 0.25–0.35%. Furthermore, the atmosphere in the inside of heating furnace 41 is exchanged for an atmosphere consisting solely of helium gas, and in this atmosphere consisting solely of helium, dehydrated soot preform 35b is heated and rendered transparent for a period of 3–5 hours at a temperature of 1400°–1600° C., and preform 42 is thus produced.

It is possible to use this preform 42, manufactured by means of the manufacturing method for erbium doped silica of the present preferred embodiment, to produce an optical fiber, by means of, for example, the method described hereinbelow.

Figure 2:
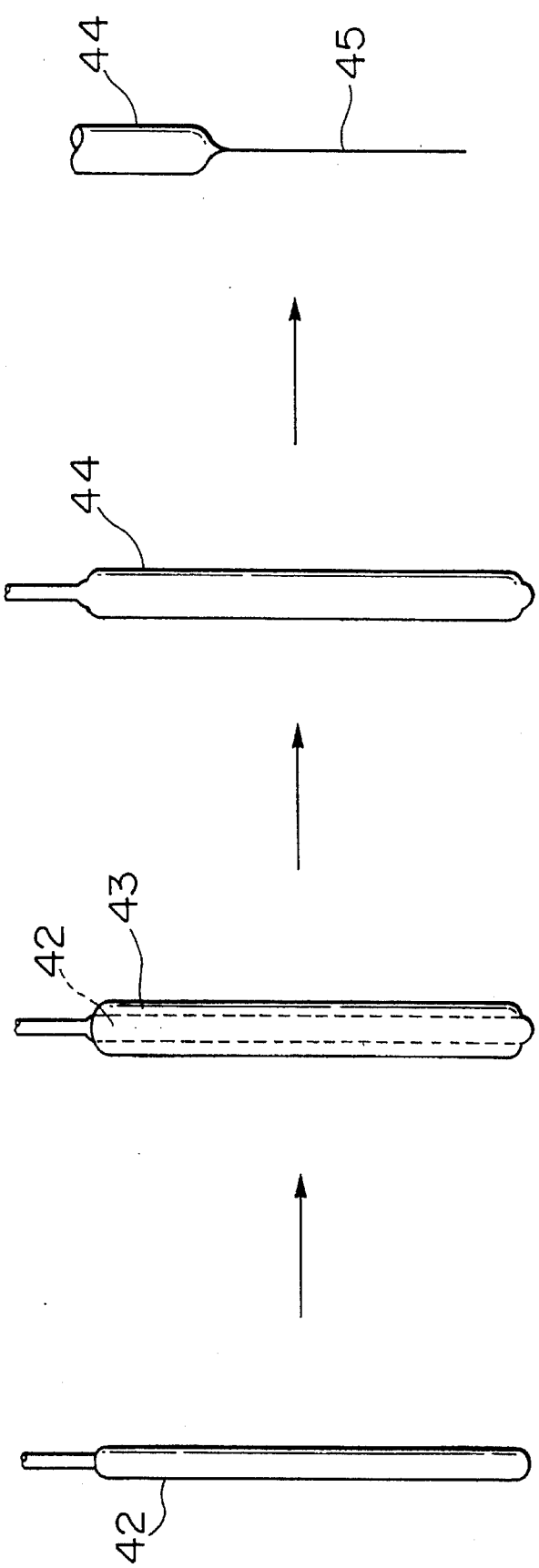
FIG. 2 shows a portion of the process carried out during the manufacturing of an erbium doped optical fiber using as a core thereof erbium doped silica manufactured using the apparatus shown in FIG. 1.

First, this preform 42 is used as a core preform, as shown in FIG. 2, and this core preform 42 is inserted into a hole for core preform insertion provided in the central portion of a cladding preform 43 which is separately produced, this is fused to form an integral structure, and an optical fiber preform 44 is obtained.

Next, this optical fiber preform 44 is placed in a fiber drawing furnace, the lead end thereof is heated and fiber drawing is conducted, and an erbium doped optical fiber 45 is produced.

As explained above, in the manufacturing method for erbium doped silica in accordance with the present preferred embodiment, in the dopant impregnation process, a soot preform 34 in a porous state is dipped in an ethanol solution containing dopants such as $ErCl_3$, $AlCl_3$, $PO(OC_2H_5)$, and the like, this is desiccated, and an impregnated soot preform 35 impregnated with dopants such as the above $ErCl_3$, $AlCl_3$, $PO(OC_2H_5)$, and the like, is produced. Thus, the doping concentration and component ratio distribution of the erbium compound, aluminum compound, and phosphorus compound in the impregnated soot preform 35 can be controlled in an extremely accurate and homogeneous manner. Accordingly, the preform 42 which is obtained by the heating and rendering transparent of the impregnated soot preform 35 is used to produce an erbium-aluminum-phosphorus doped silica having a doping concentration and a component ratio of the erbium ions, aluminum ions, and phosphorus ions which is extremely accurate and homogeneous in the radial direction and the longitudinal direction of preform 42.

Furthermore, the preform 42 has a doping concentration and component ratio of the erbium ions, aluminum ions, and phosphorus ions, which is extremely accurate and homogeneous in the radial direction and longitudinal direction, as stated above, so that in an optical fiber 45 using this preform 42 as a core, the problem which is present in the erbium doped optical fiber produced according to conventional methods, namely, that the concentration of erbium ions and aluminum ions in the core section is low, is not encountered. Accordingly, an optical amplifier which is constructed using such optical fibers 45 has a gain efficiency which is clearly superior to that of the conventional article.

Furthermore, in the manufacturing method for erbium doped silica of the present preferred embodiment, $AlCl_3$ and $PO(OC_2H_5)$, which has the effect of suppressing the segregation of $AlCl_3$, are impregnated homogeneously in soot preform 34, in addition to $ErCl_3$, so that the segregation of $AlCl_3$ in the preform formation process is suppressed, and as a result of this, it is possible to set the doping concentration of the aluminum ions in the preform 42 at a high level.

Furthermore, the preform 42 has a high aluminum ion doping concentration, as explained above, so that in an optical fiber 45 using such a preform 42 as a core thereof, the gain wavelength band is stabilized in comparison with a conventional erbium doped optical fiber. Accordingly, it is possible to broaden the band of the gain wavelength band characteristics of an optical amplifier constructed using such optical fibers 45.

(Experimental Example)

Using an apparatus having a structure which is identical to that of the manufacturing apparatus for erbium doped silica of the above preferred embodiment, the manufacturing method for erbium doped silica of the present invention was carried out. First, a silica glass seed rod 33 having a diameter of 22 mm was prepared, one end thereof was connected to base material lifting apparatus 25, which was provided above reaction chamber 22, and the other end of this seed rod 33 was disposed within reaction chamber 22 so as to be positioned in the vicinity of the opening of burner 23.

Next, oxygen and hydrogen were supplied to burner 23 and a flame was formed, 500 cc/min of $SiCl_4$ gas was introduced into VAD apparatus 21 using raw material gas supply apparatus 26, and furthermore, $SiCl_4$ was subjected to pyrolysis, and a soot comprising $SiO_2$ microparticles was formed, and this soot was deposited on the lead end of the seed rod 33. Furthermore, at the time of the deposition of this soot, the base material lifting apparatus 25 was operated and the seed rod 33 was moved in an upward direction at a rate of 60 mm/hour so as to deposit the soot. When this operation was continued for a period of 5 hours, a soot preform 34 having a cylindrical cross section, a diameter of 60 mm, and a length of 300 mm, was obtained in the direction of the lower side of the seed rod 33.

Figure 3:
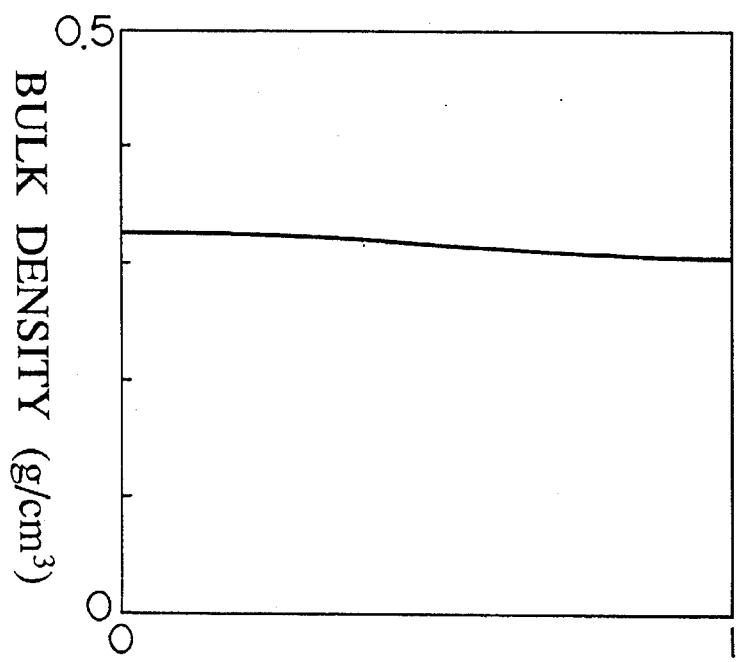
FIG. 3 is a graph showing the bulk density distribution of a soot preform 34 manufactured according to a preferred embodiment.

The bulk density distribution of the soot preform 35 having a diameter of 60 mm and a length of 300 mm, which was obtained in the above described soot formation process, was measured. The results are shown in the graph in FIG. 3. As is clear from the graph of FIG. 3, the bulk density distribution of the soot preform 35 is homogeneous in the radial direction thereof, and the bulk density is within a range of approximately 0.32 $g/cm^3$–0.31 $g/cm^3$.

Next, the soot preform 34 which was produced in the soot formation process was dipped in an ethanol solution containing 0.1 (wt %) of $ErCl_3$, 25 (wt %) of $AlCl_3$, and 1.5 (wt %) of $PO(OC_2H_5)$, at room temperature, and this soot preform 34 was thus impregnated with these dopants.

Next, the soot preform 35, which had completed the dopant impregnation process and was thus impregnated with dopants, was heated to a temperature of 70° C. in an atmosphere of nitrogen gas and thus desiccated. Furthermore, this desiccated soot preform 35a was placed in a heating furnace 41 for preforms, the atmosphere of the inside of which comprised a helium atmosphere with $Cl_2$ gas present in an amount of 0.3%, thermal dehydration was conducted for a period of 3 hours at a temperature of 1000° C., and a dehydrated soot preform 35b was obtained. Next, the atmosphere in the inside of heating furnace 41 for preforms was altered so as to contain solely helium, and the dehydrated soot preform 35b was heated for 4 hours at a temperature of 1500° C. and rendered transparent, and preform 42 was thus manufactured.

The doping concentrations of erbium ions and aluminum ions in this preform 42, which was manufactured in the preform formation process, were measured, and these dopant concentrations were found to be $1 \times 10^3$ ppm in the case of erbium ions and $6 \times 10^4$ ppm in the case of aluminum ions.

Figure 4:
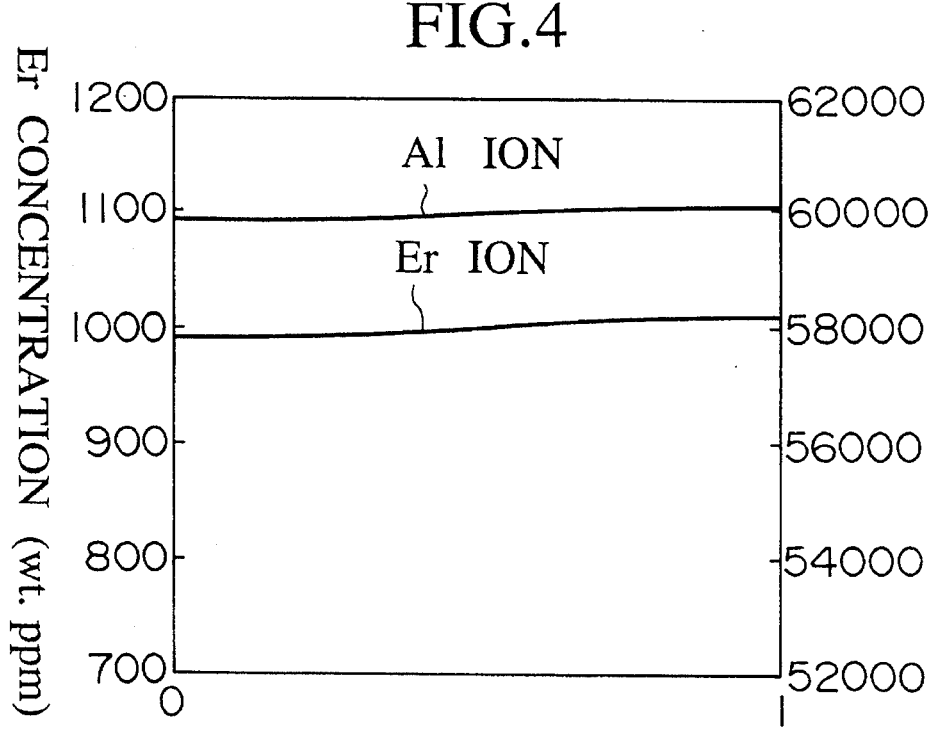
FIG. 4 is a graph showing the concentration distribution (in the radial direction) of erbium ions and aluminum ions in a preform 42 manufactured according to a preferred embodiment.

Furthermore, the concentration distribution of the erbium ions and the aluminum ions was measured in the radial direction of preform 42, and as shown in the graph of FIG. 4, the concentration distribution of erbium ions and aluminum ions in the radial direction of preform 42 was essentially homogeneous.

Figure 5:
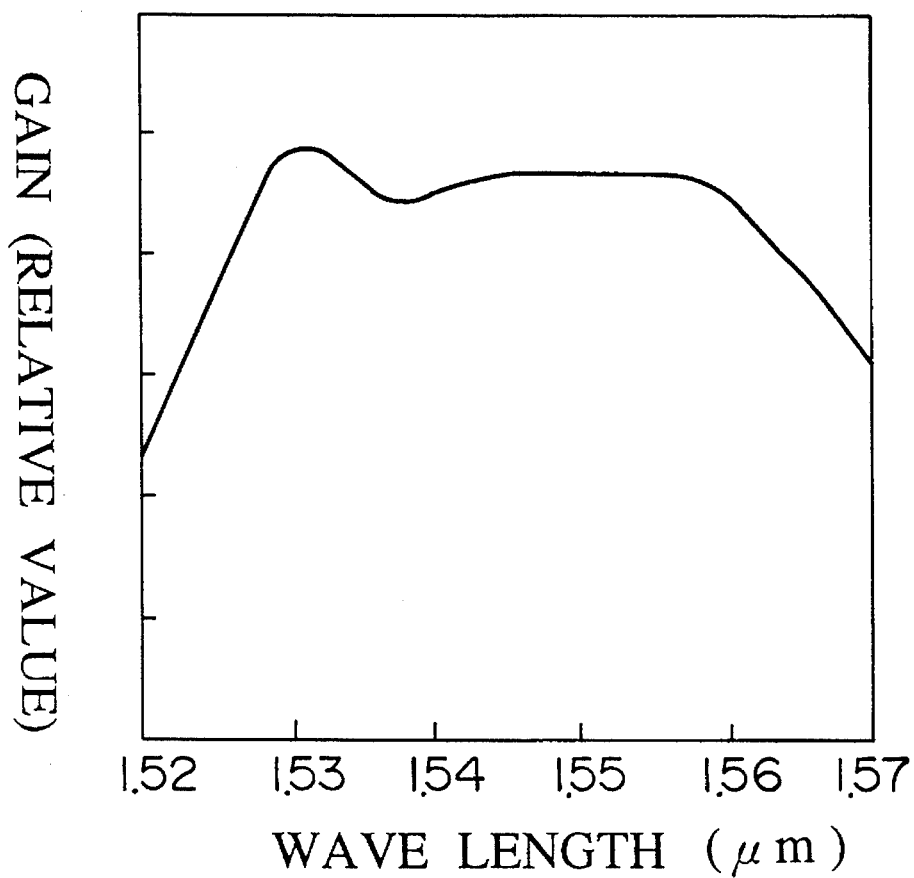
FIG. 5 is a graph showing the results of the measurement of gain wavelength band in the vicinity of the 1.55 μm wavelength band (1.53 μm–1.56 μm), with respect to an optical fiber 45 manufactured in accordance with a preferred embodiment of the present invention.
Figure 6:
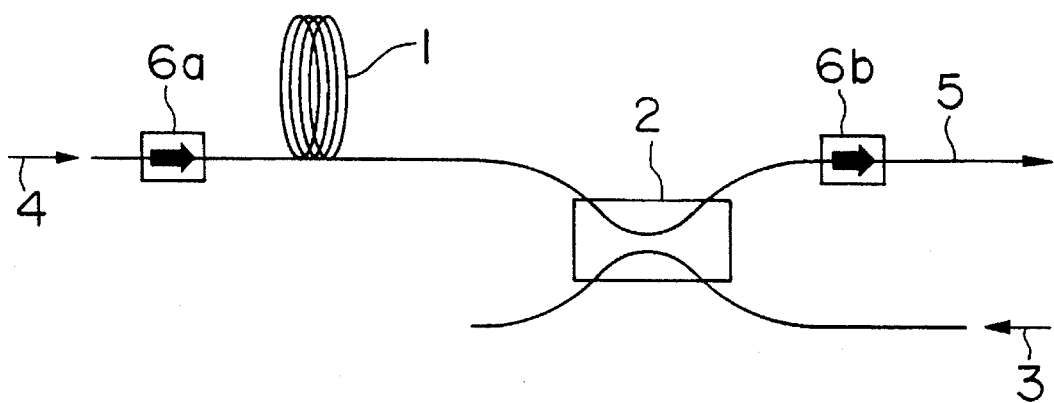
FIG. 6 is for the purpose of explaining an example of the technique of the direct optical amplification which utilizes an optical fiber doped with a rare earth metal, which is an example of the field of the use of the present invention.
Figure 7:
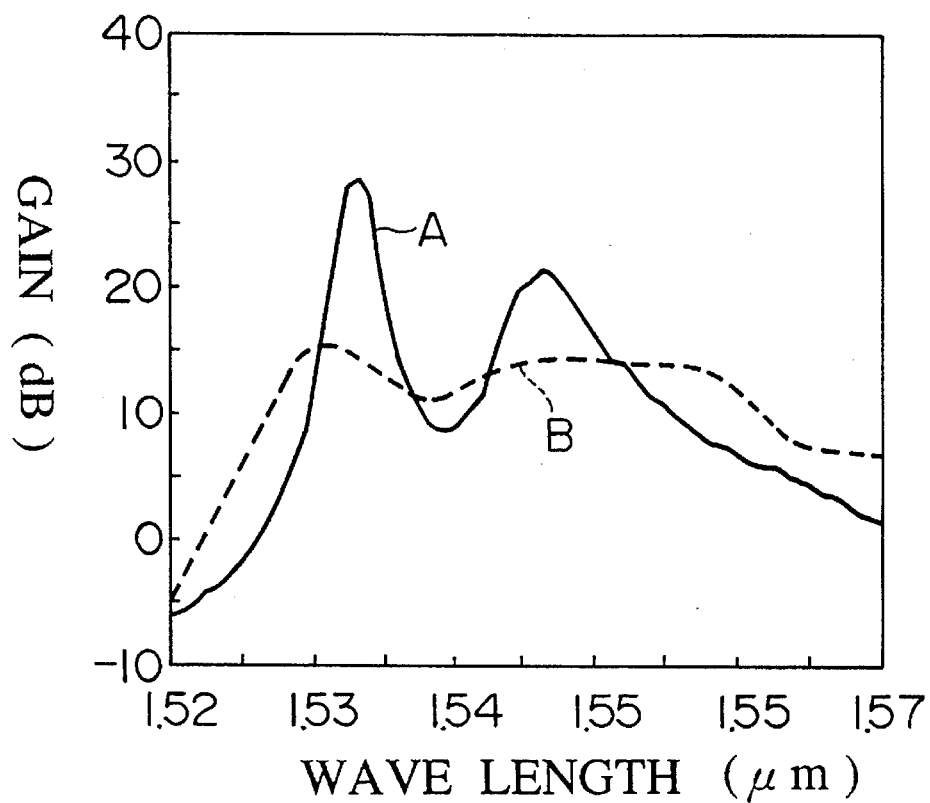
FIG. 7 is a graph showing the gain wavelength band in the vicinity of the 1.55 μm wavelength band (1.53 μm–1.56 μm) of an optical fiber doped solely with erbium.
Figure 8:
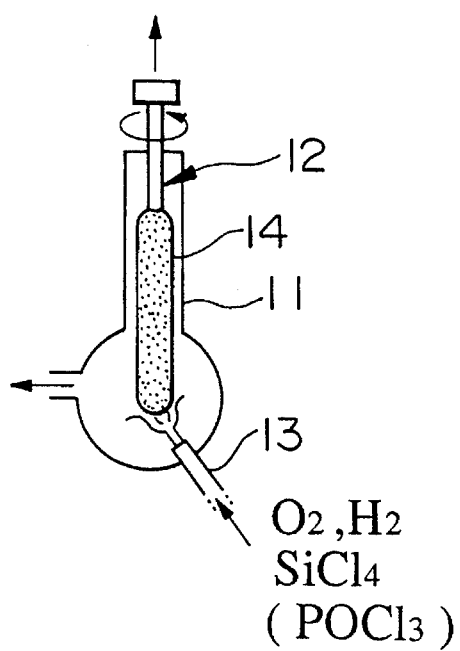
FIG. 8 shows an VAD apparatus which is appropriate for use in conducting a conventional manufacturing method of erbium-aluminum co-doped optical fibers.

Next, this preform 42 was inserted into the hole for core preform insertion of a cladding preform 43 made of fluorine doped silica which had been produced in advance; this was fused to form an integral structure, and an optical fiber preform 44 was thus manufactured. In addition, this optical fiber preform 44 was placed in a fiber drawing furnace, the lead end thereof was heated and fiber drawing was conducted, and an erbium doped optical fiber 45 was thus obtained. The gain wavelength band of the optical fiber 45 which was thus obtained was measured in the vicinity of the 1.55 μm wavelength band (1.53 μm–1.56 μm), and as shown in the graph of FIG. 5, the gain wavelength band in the vicinity of the 1.55 μm wavelength band was stable.

What is claimed is:

1. A method of manufacturing an erbium-doped silica glass preform, comprising
 a) depositing a silica glass soot on a seed rod thereby forming on said rod a soot preform in a porous state,
 b) dipping said soot preform into a solution containing an erbium compound, an aluminum compound and a phosphoric ester, and desiccating said preform to form an erbium, phosphorus and aluminum impregnated soot preform, the solution containing an amount of said aluminum compound so that said soot preform has an aluminum content of more than 3 wt. % after desiccation, and c) heating said desiccated preform so as to render it transparent, thereby forming an erbium-doped glass preform.

2. A method according to claim 1, wherein said erbium compound is an erbium chloride.

3. A method according to claim 1, wherein said aluminum compound is aluminum chloride.

4. The method according to claim 1, wherein said solution containing an erbium compound, an aluminum compound and a phosphoric ester is an alcohol solution or an aqueous solution.

5. The method according to claim 1, including the further step of d) forming a cladding by a method which comprises using said erbium-doped preform as a core preform.

e) fusing said cladding and said erbium-doped preform to form an integral structure thereby forming an optical fiber preform, and f) drawing said optical fiber preform under heat to form an erbium-doped optical fiber.

6. The method according to claim 1 wherein the heating is performed in an inert atmosphere consisting essentially of helium.

* * * * *